(12) United States Patent
Blakely et al.

(10) Patent No.: US 7,844,841 B2
(45) Date of Patent: Nov. 30, 2010

(54) ELECTRONIC DEVICE

(75) Inventors: Robert J. Blakely, Fort Collins, CO (US); Samuel M. Babb, Fort Collins, CO (US); Bradley D. Winick, Fort Collins, CO (US); Robert B. Smith, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 11/742,440

(22) Filed: Apr. 30, 2007

(65) Prior Publication Data

US 2008/0270808 A1 Oct. 30, 2008

(51) Int. Cl.
G06F 1/00 (2006.01)
H01F 19/00 (2006.01)
H02J 1/00 (2006.01)
H02M 7/00 (2006.01)

(52) U.S. Cl. .................. 713/300; 363/13; 323/355; 307/43

(58) Field of Classification Search ................ 713/300; 363/13; 323/355; 307/43
See application file for complete search history.

(56) References Cited

U.S. PATENT DOCUMENTS

| 5,959,372 | A | * | 9/1999 | Every | ..................... 307/131 |
| 6,166,528 | A | * | 12/2000 | Rossetti et al. | ............. 323/283 |
| 6,288,919 | B1 | * | 9/2001 | Jain | ........................ 363/89 |
| 6,694,438 | B1 | * | 2/2004 | Porter et al. | ................. 713/300 |

OTHER PUBLICATIONS

Drobnik et al, PC Platform Power Distribution System Past Application, Today's Challenge and Future Direction, 1999, IEEE, section 2-1.*

* cited by examiner

Primary Examiner—Mark Connolly

(57) ABSTRACT

An electronic device is disclosed herein. An embodiment of the electronic device comprises an electronic component, wherein the electronic component is operated by a DC voltage. The electronic component comprises an AC to DC converter that converts an AC voltage to the DC voltage, wherein the RMS value of the AC voltage is greater than the DC voltage. The electronic device further comprises a power supply comprising an input and an output. The input is connectable to a line voltage and the output is connected to the AC to DC converter of electronic component. The AC voltage is output by the output of the power supply.

19 Claims, 2 Drawing Sheets

ELECTRONIC DEVICE

BACKGROUND

Many electronic devices have several components that operate individually and, thus, require separate power sources. The electronic device typically includes a single power supply that supplies power to the different electronic components. The power required by many of the electronic components is high current, low voltage DC. The high current causes a loss between the power supply and the electronic components. The problem is exasperated by the low voltage because a seemingly small loss may be a significant portion of the voltage that is output by the power supply.

Therefore, conventional electronic devices use a power supply that outputs several different voltages at high current in order to meet the power requirements of the different components.

DETAILED DESCRIPTION

The devices and methods described herein serve to provide power to electronic components within an electronic device. A power supply converts a line voltage to a high voltage at a high frequency. The high voltage, high frequency output or outputs of the power supply are used to power the electronic components. More specifically, the electronic components convert the high frequency, high voltage to a usable DC voltage. The transmission of high voltage at a low current is not as susceptible to resistance in the power lines as low voltage at a high current because less current is drawn through the power lines. The high frequency power tends to be easier to convert to a usable DC voltage than low frequency power.

Figure 1:
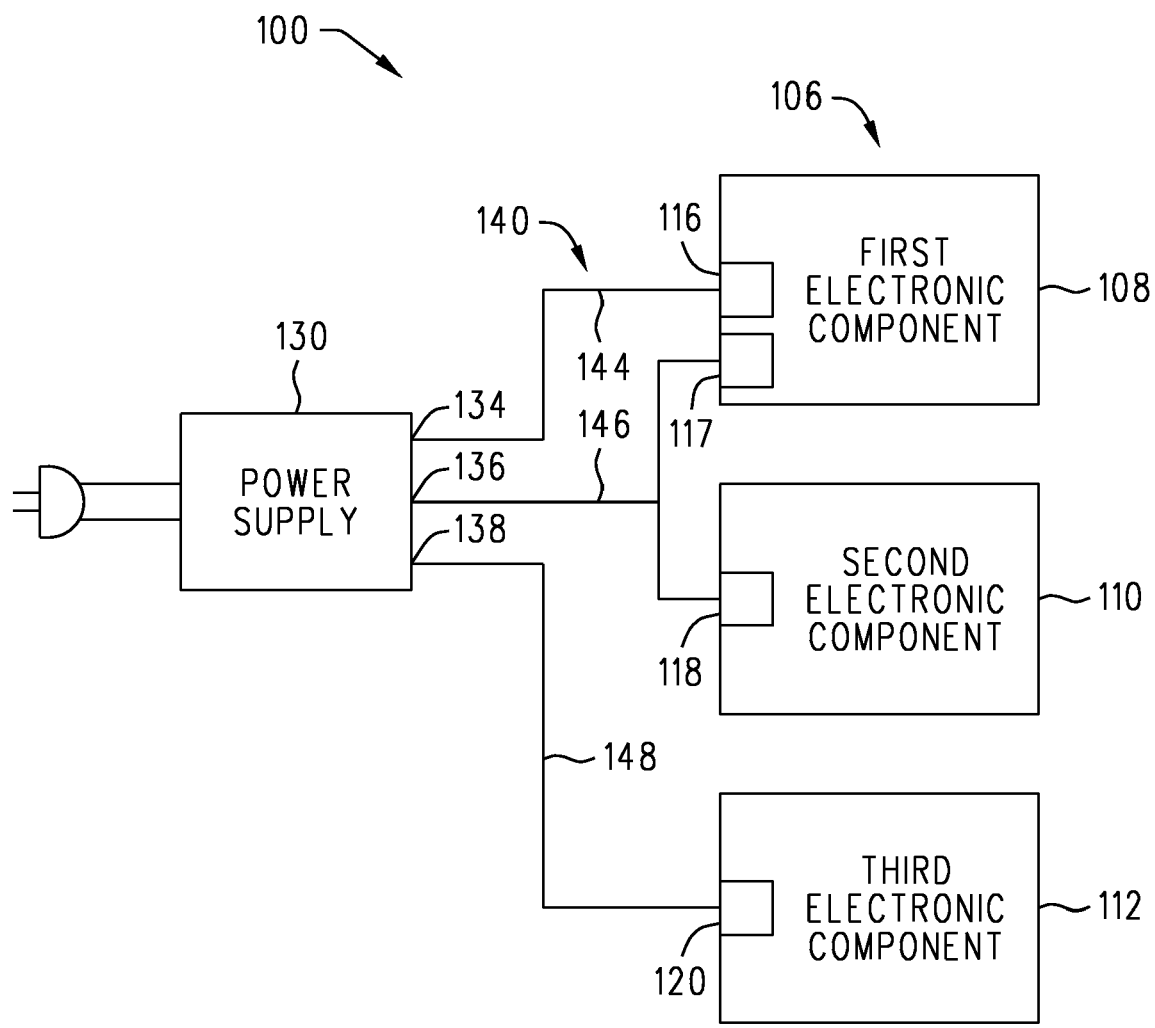
FIG. 1 is an embodiment of an electronic device.

FIG. 1 shows an embodiment of an electronic device 100 that includes a plurality of electronic components 106. In the embodiment of FIG. 1, three electronic components 106 are present and are referred to as the first electronic component 108, the second electronic component 110, and the third electronic component 112. The electronic device may be a computer or the like. Accordingly, the electronic components 106 can be, as examples, circuit boards, motherboards, optical drives, or magnetic drives. In such an embodiment, the electronic components 106 may draw several hundred watts at voltages ranging from 3 volts to 12 volts. Therefore, the current draw of the electronic components 106 may be upwards of 50 amperes. Conventional electronic devices require thick gauge wires to conduct the high current to the electronic devices. As described herein, the electronic device 100 may uses thinner gauge wire because lower current is supplied to the electronic components 106.

Each of the electronic components 106 includes at least one converter used to convert voltages output by a power supply to a usable DC voltage for each of the electronic components 106. In some embodiments, the power supply outputs high frequency, high voltage that is converted to usable DC. The converters may be, as an example, buck converters.

A first converter 116 and a second converter 117 are associated with the first electronic component 108. A third converter 118 is associated with the second electronic component 110. A fourth converter 120 is associated with the third electronic component 112. The converters convert high voltage power to usable DC in order to power their respective electronic components 106. For example, the second electronic component 110 may operate at 12 volts DC and may draw 15 amperes. The voltage supplied to the third converter 118 may be 400 volts at a frequency of 1 k Hz. The third converter 118 rectifies and regulates the 400 volt 1 k Hz supply voltage to the 12 volts DC required by the second electronic component 110. The current supply to the second electronic component 118 is, therefore, only 2.2 amperes. The converters are described in greater detail below.

The electronic device also includes a power supply 130. The power supply converts a line voltage to the above-described high voltage that is supplied to the electronic components 106. In some embodiments, the high voltage is AC having a relatively high frequency. The line voltage, as examples, may be 120 volts at 60 Hz or 220 volts at 50 Hz. In the embodiment of FIG. 1, the power supply 130 has three outputs, a first output 134, a second output 136, and a third output 138. Each output is connected to an electronic component by lines 140, which are referred to individually as line 144, line 146, and line 148. The lines 140 are adapted to carry the above-described high frequency, high voltage to power the electronic components 106. In the embodiment of FIG. 1, the outputs of the power supply 130 may all output different voltages, which may be at different frequencies.

Figure 2:
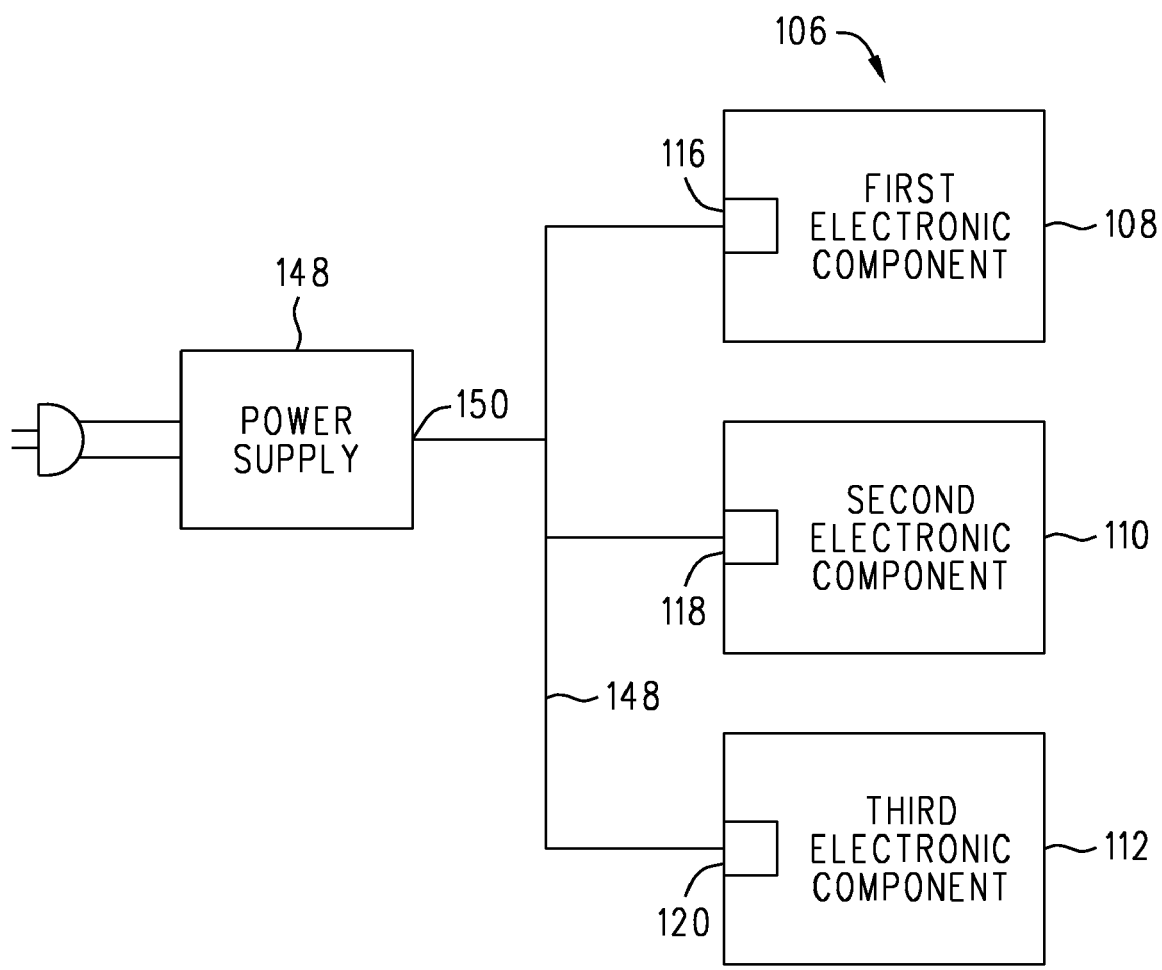
FIG. 2 is another embodiment of an electronic device.

Another embodiment of the electronic device 100 is shown in FIG. 2. The power supply 148 has a single output 150 that outputs a high voltage at a high frequency. Accordingly, each of the electronic devices 106 receives the same high frequency, high voltage from the power supply 148. The associated converters 116, 118, 120 convert the voltage to the appropriate voltages to operate the electronic components 106.

The high voltage power transmission used in the electronic device 100 enables the power to be transferred from the power supply 130, 148 to the electronic devices 106 with less power loss in the lines 140. More specifically, the higher voltage reduces the amount of current being conducted, which reduces the loss due to the resistance in the lines 140. As described in the example above, the amount of current that conducts in the second line 146 was reduced from 15 amperes to 2.2 amperes. In some embodiments, the term high voltage means a root mean square (RMS) voltage that is higher than the DC voltage output from a converter 116, 118, 120. In some embodiments, the high voltage is between one hundred and one thousand volts.

The use of a high frequency enables the converters 116, 118, 120 to convert the AC power to DC power more efficiently. In some embodiments, the frequency of the AC power output from the power supply 130, 148 is higher than the frequency of the line voltage. For example, the frequency of the AC power may be between 100 and 1 k Hz. The frequency may be selected so as to provide easy conversion to DC voltages without causing electromagnetic interference within the electronic device 100.

The converters 116, 118, 120 have been described above as converting the high frequency, high voltage to DC. In some embodiments, the electronic devices 106 may require AC. In such embodiments, the converters 116, 118, 120 convert the high voltage AC to a voltage and/or frequency to operate the electronic components 106. For example a converter may convert the above described 400 volts to 20 volts, which substantially reduces the current conducted from the power supply 130.

Referring to FIG. 1, in some embodiments, the electronic components 106 may be required to operate using a plurality of different DC voltages. In such embodiments, an electronic component may have a plurality of different converters associated therewith. In the embodiment of the electronic device 100 of FIG. 1, the first electronic component 108 has two converters 116 and 117. These converters may supply different DC voltages to the first electronic component 106. For example, the first converter 116 may convert a first voltage on the first line 144 to a first DC voltage. The second converter 117 may convert a second voltage on the second line 146 to a second DC voltage. Thus, both DC voltages may be supplied to the first electronic component with little line loss between the power supply 130 and the first electronic component 108.

In other embodiments, a single converter may convert power from the power supply to a plurality of different DC voltages. For example, the third converter 118 may convert the voltage on the second line 146 to two different DC voltages that are used by the second electronic component 110.

The same may apply to the embodiment of the electronic device of FIG. 2. The power voltage output by the power supply may be converted to a plurality of different voltages by the converters 116, 118, 120. Thus, all the components 106 of the electronic device 100 may use the same supply voltage. Therefore, the power supply 130 only needs to output a single voltage. In addition, as new electronic components are developed, they may use the same voltage so long as they have converters associated with them. Thus, the addition of a new electronic component to the electronic device 100 does not require changing the power supply.

What is claimed is:

1. An electronic device comprising:
a first electronic component, wherein said first electronic component is operated by a DC voltage, said first electronic component comprising a first AC to DC converter that converts a first AC voltage to said DC voltage, the RMS value of said AC voltage being greater than said DC voltage; and
a power supply comprising an input and a first output, said input being connectable to a line voltage, said first output being connected to said first AC to DC converter, wherein said first AC voltage is output by said first output;
wherein said AC voltage is greater than said line voltage.

2. The electronic device of claim 1, wherein the frequency of said AC voltage is greater than the frequency of said line voltage.

3. The electronic device of claim 1, wherein the frequency of said AC voltage is approximately one thousand hertz.

4. The electronic device of claim 1, wherein said first electronic component comprises a second AC to DC converter; wherein said second AC to DC converter is connected to said power supply; and wherein the DC voltage generated by said first AC to DC converter is different than the DC voltage generated by said second AC to DC converter.

5. The electronic device of claim 4, wherein said power supply comprises a second output and wherein said second AC to DC converter is connected to said second output.

6. The electronic device of claim 5, wherein the voltage of said first output is different than the voltage of said second output.

7. The electronic device of claim 1 and further comprising a second electronic component, wherein said second electronic component comprises an AC to DC converter connected to said first output of said power supply.

8. The electronic device of claim 1, and further comprising a second electronic component, said second electronic component comprising a second AC to DC converter; wherein said power supply further comprises a second output connected to said second AC to DC converter.

9. An electronic device comprising:
a first electronic component, wherein said first electronic component is operated by a DC voltage, said first electronic component comprising a first AC to DC converter that converts a first AC voltage to said DC voltage, the RMS value of said AC voltage being greater than said DC voltage; and
a power supply comprising an input and a first output, said input being connectable to a line voltage, said first output being connected to said first AC to DC converter, wherein said first AC voltage is output by said first output;
wherein said AC voltage is between one hundred and one thousand volts.

10. An electronic device comprising:
a first electronic component, wherein said first electronic component is operated by a DC voltage, said first electronic component comprising a first AC to DC converter that converts a first AC voltage to said DC voltage, the RMS value of said AC voltage being greater than said DC voltage;
a power supply comprising an input and a first output, said input being connectable to a line voltage, said first output being connected to said first AC to DC converter, wherein said first AC voltage is output by said first output; and
comprising a second electronic component, said second electronic component comprising a second AC to DC converter; wherein said power supply further comprises a second output connected to said second AC to DC converter;
wherein the voltage of said first output is different than the voltage of said second output.

11. The electronic device of claim 10, wherein said first electronic component is a motherboard.

12. A computer system comprising:
a power supply having an input and a first output, said input being connectable to a line voltage, wherein said first output outputs an AC voltage that is greater than said line voltage; and
a first computer component, said first computer component having a first AC to DC converter, wherein the input of said first AC to DC converter is connected to said first output of said power supply;
wherein the DC voltage of said first AC to DC converter supplies power to operate said first computer component.

13. The computer system of claim 12, wherein said power supply further comprises a second output, the voltage of said second output being different than the voltage of said first output; wherein said first computer component comprises a second AC to DC converter, the output of said second AC to DC converter being used as a second power source for said first computer component; wherein the input of said second AC to DC converter is connected to said second output of said power supply.

14. The computer system of claim 13, and further comprising a second computer component, said second computer component comprising an AC to DC converter, wherein the output of said AC to DC converter supplies power to said second computer component; said AC to DC converter of said second computer component being connected to said first output of said power supply.

15. The computer system of claim 13, and further comprising a second computer component, said second computer component comprising an AC to DC converter, wherein the output of said AC to DC converter supplies power to said second computer component; said AC to DC converter of said second computer component being connected to a second output of said power supply.

16. A method for providing power to electronic components of a computer system, said method comprising:
   providing a line voltage to a power supply, said power supply having a first output wherein the a first voltage of said first output is an AC voltage that is greater than said line voltage;
   providing said first voltage to a first electronic component;
   converting said first voltage to a first DC voltage; and
   powering said first electronic component using said first DC voltage.

17. The method of claim 16, wherein said method further comprises:
   providing said first voltage to a second electronic component;
   converting said first voltage to a first DC voltage; and
   powering said second electronic component using said first DC voltage.

18. The method of claim 16, wherein said method further comprises:
   providing said power supply with a second output, wherein a second voltage of said second output is an AC voltage that is greater than said line voltage;
   providing said second voltage to said first electronic component;
   converting said second voltage to a second DC voltage; and
   powering said first electronic component using said first DC voltage and said second DC voltage.

19. The method of claim 16, wherein said method further comprises:
   providing said power supply with a second output, wherein a second voltage of said second output is an AC voltage that is greater than said line voltage;
   providing said second voltage to a second electronic component;
   converting said second voltage to a second DC voltage; and
   powering said second electronic component using said second DC voltage.

* * * * *

UNITED STATES PATENT AND TRADEMARK OFFICE
CERTIFICATE OF CORRECTION

| | |
|---|---|
| PATENT NO. | : 7,844,841 B2 |
| APPLICATION NO. | : 11/742440 |
| DATED | : November 30, 2010 |
| INVENTOR(S) | : Robert J. Blakely et al. |

It is certified that error appears in the above-identified patent and that said Letters Patent is hereby corrected as shown below:

In column 5, line 7, in Claim 16, after "the" delete "a".

Signed and Sealed this
Twenty-second Day of March, 2011

David J. Kappos
*Director of the United States Patent and Trademark Office*